United States Patent

Bonomi

(10) Patent No.: US 6,446,934 B2
(45) Date of Patent: Sep. 10, 2002

(54) FLUID CONTROL VALVE WITH BUTTERFLY-TYPE FLOW CONTROL ELEMENT WITH HIGH OPERATING RELIABILITY

(75) Inventor: Aldo Bonomi, Lumezzane (IT)

(73) Assignee: Rubinetterie Bresciane Bonomi S.p.A., Lumezzane (IT)

( * ) Notice: Subject to any disclaimer, the term of this patent is extended or adjusted under 35 U.S.C. 154(b) by 0 days.

(21) Appl. No.: 09/726,407

(22) Filed: Dec. 1, 2000

(30) Foreign Application Priority Data

Dec. 9, 1999 (IT) ........................... MI9900738 U

(51) Int. Cl.[7] ................................. F16K 1/22
(52) U.S. Cl. ............................ 251/306; 251/308
(58) Field of Search ........................ 251/305, 306, 251/307, 308

(56) References Cited

U.S. PATENT DOCUMENTS

| | | | | |
|---|---|---|---|---|
| 3,025,035 A | * | 3/1962 | Swain | 251/306 |
| 3,250,510 A | * | 5/1966 | Williams | 251/306 X |
| 3,550,905 A | * | 12/1970 | Sifford | 251/306 |
| 3,986,699 A | * | 10/1976 | Wucik, Jr. et al. | 251/307 X |
| 4,289,296 A | * | 9/1981 | Krause | 251/306 |
| 4,349,206 A | | 9/1982 | Simm et al. | |
| 4,371,146 A | | 2/1983 | Mese et al. | |
| 4,398,695 A | * | 8/1983 | Torche | 251/306 |
| 4,770,393 A | * | 9/1988 | Huberson | 251/306 |
| 4,998,708 A | * | 3/1991 | Pavanel | 251/306 |
| 5,419,530 A | | 5/1995 | Kumar | |
| 5,482,252 A | * | 1/1996 | Kamezawa | 251/305 X |
| 5,741,006 A | * | 4/1998 | Murai et al. | 251/306 X |

FOREIGN PATENT DOCUMENTS

| | | | | |
|---|---|---|---|---|
| CA | 695037 | * | 9/1964 | 251/306 |
| DE | 10 22 437 | | 1/1958 | |
| DE | 27 50 892 | | 5/1979 | |
| GB | 953981 | * | 4/1964 | 251/306 |
| GB | 1 299 508 | | 12/1972 | |
| GB | 2 284 647 | | 6/1995 | |

* cited by examiner

Primary Examiner—Lesley D. Morris
Assistant Examiner—John Bastianelli
(74) Attorney, Agent, or Firm—Guido Modiano; Albert Josif; Daniel O'Byrne

(57) ABSTRACT

A fluid control valve with a butterfly-type flow control element, with high operating reliability, comprising a valve body which is crossed by a passage with an inlet and an outlet which can be connected to two branches of a duct for a fluid to be controlled by means of the valve. The valve body accommodates, in an intermediate region of the passage, a butterfly-type flow control element which can be actuated in order to open or close the passage. The valve body supports, in the intermediate region of the passage, an annular gasket which can be engaged by the flow control element in the closure position. The valve body is provided in at least two parts which are mutually coupled at the region that is occupied by the annular gasket and lock the annular gasket between the parts in a mutual coupling position.

12 Claims, 1 Drawing Sheet

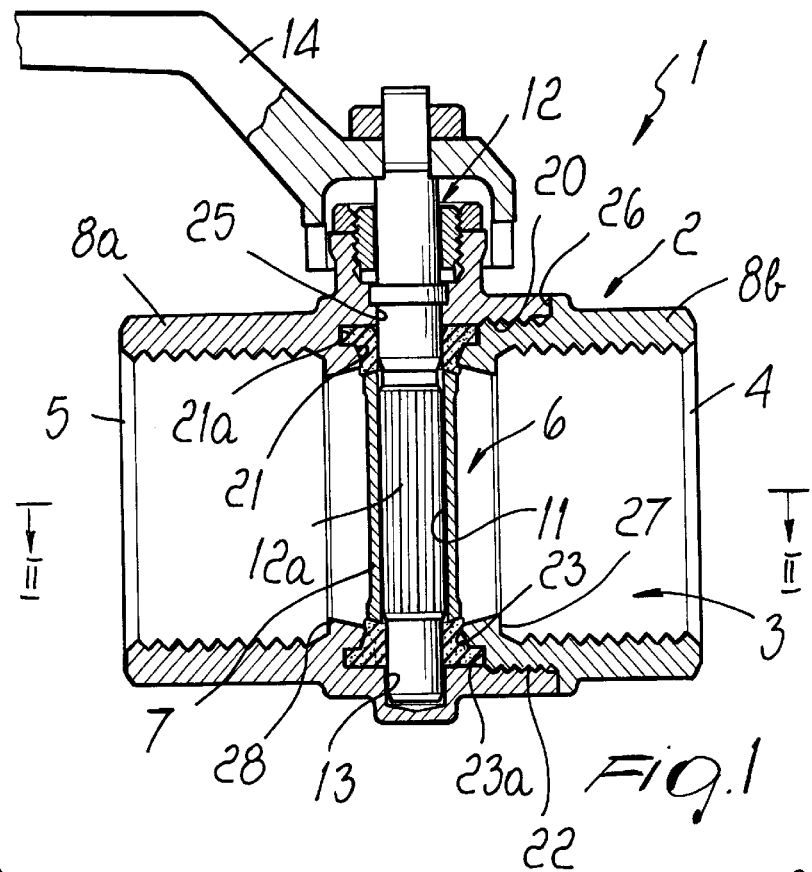
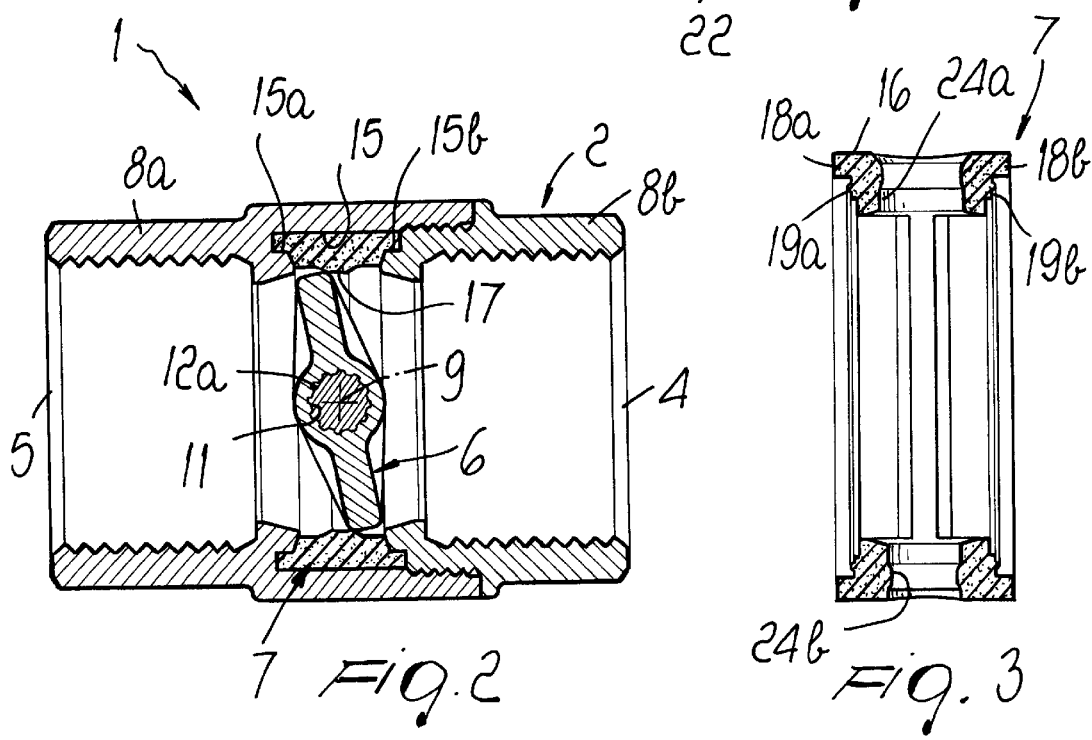

FLUID CONTROL VALVE WITH BUTTERFLY-TYPE FLOW CONTROL ELEMENT WITH HIGH OPERATING RELIABILITY

BACKGROUND OF THE INVENTION

The present invention relates to a fluid control valve with butterfly-type flow control element with high operating reliability.

It is known that fluid control valves with a butterfly-type flow control element are generally constituted by a valve body which is formed monolithically and is crossed by a passage which has, on the valve body, an inlet and an outlet which can be connected to the two branches of a duct for a fluid to be controlled by means of the valve. The valve body accommodates, in an intermediate region of the passage, a butterfly-type flow control element which can be actuated in order to open or close the passage.

In some valves, in an intermediate region of the passage the valve body supports an annular gasket which is fixed to the valve body and can be engaged by the flow control element when it is moved into the closure position.

In these valves, the annular gasket is coupled to a circumferential protrusion of the valve body which lies inside the passage and has, in radial cross-section, a dovetail profile.

In these valves, the connection between the annular gasket and the valve body reduces the actual passage section for the fluid, owing to the fact that the annular gasket necessarily protrudes inside the fluid passage. Moreover, in order to give the annular gasket a rigidity which ensures the required seal when the butterfly-type flow control element is moved into the closure position, a metal core is provided inside the annular gasket. The presence of the metal core has the drawback that it requires a considerable force in order to close the valve, since it reduces the deformability of the annular gasket and therefore contrasts, with a strong force, the final closure movement and the initial opening movement of the flow control element, i.e., when the flow control element is in contact with the annular gasket.

In order to solve the problem of an excessive reduction of the passage for the fluid inside the valve body, in some valves, particularly in valves designed to be fitted on ducts having a small cross-section, the body is formed in two parts so as to be able to have a duct which has a larger cross-section at the region occupied by the butterfly-type flow control element. Although these valves solve the problem of fluid passage reduction, they still have the drawback of requiring considerable force in order to be able to move the butterfly-type flow control element at the end of the closure movement and at the beginning of the opening movement.

In other valves, the gasket, instead of being fixed to the valve body, is fitted on the flow control element and protrudes from its perimeter.

With these valves, the annular gasket is much more exposed, with respect to the previously cited valves, to the action of the fluid that flows through the valve. The action of the fluid produces wear and deformation of the gasket, which can reduce the sealing effect of the gasket when the valve is closed.

In all of the above-described valves there is also the problem of separation of the annular gasket from the butterfly-type flow control element or from the valve body during closure and opening, since the movement of the flow control element produces a deformation of the annular gasket and fluid can seep between the annular gasket and the region of the valve body or of the flow control element to which the annular gasket is applied.

This seepage of fluid has the effect of causing separation of the annular gasket and therefore of reducing or even eliminating the sealing effect of the annular gasket.

SUMMARY OF THE INVENTION

The aim of the present invention is to solve the above-described problems, by providing a fluid control valve provided with an annular sealing gasket which is associated with the valve body and is designed to cooperate with the butterfly-type flow control element when it is moved into the closure position, and in which the possibility of separation of the annular gasket from the valve body is excluded with absolute safety.

Within this aim, an object of the invention is to provide a fluid control valve with a butterfly-type flow control element in which the presence of the annular gasket does not reduce excessively, in the open condition, the passage section available to the fluid.

Another object of the invention is to provide a fluid control valve with a butterfly-type flow control element which excludes the possibility of seepage of fluid between the annular gasket and the valve body.

Another object of the invention is to provide a fluid control valve with a butterfly-type flow control element in which the annular gasket is protected against excessive wear on the part of the butterfly-type flow control element and on the part of the fluid that flows through the valve.

This aim and these and other objects which will become better apparent hereinafter are achieved by a fluid control valve with a butterfly-type flow control element, comprising a valve body which is crossed by a passage with an inlet and an outlet which can be connected to two branches of a duct for a fluid to be controlled by means of the valve; said valve body accommodating, in an intermediate region of said passage, a butterfly-type flow control element which can be actuated in order to open or close said passage; said valve body supporting, in said intermediate region of the passage, an annular gasket which can be engaged by said flow control element in the closure position, characterized in that said valve body is provided in at least two parts which are mutually coupled at a region that is occupied by said annular gasket and lock said annular gasket between said parts in a mutual coupling position.

BRIEF DESCRIPTION OF THE DRAWINGS

Further characteristics and advantages of the present invention will become better apparent from the following detailed description of a fluid control valve with a butterfly-type flow control element according to the invention, illustrated only by way of non-limitative example in the accompanying drawings, wherein:

FIG. 1 is an axial sectional view the valve according to the invention;

FIG. 2 is a sectional view of FIG. 1, taken along the line II—II;

FIG. 3 is an axial sectional view of the annular gasket, taken as shown in FIG. 1, but with the gasket extracted from the valve body.

DESCRIPTION OF THE PREFERRED EMBODIMENTS

With reference to the figures, the fluid control valve according to the invention, generally designated by the reference numeral 1, comprises a valve body 2 which is crossed by a passage 3 provided with an inlet 4 and with an outlet 5 which can be connected to the two branches of a duct (not shown) for a fluid, particularly a liquid, to be controlled by means of the valve 1. The valve body 2 accommodates, in an intermediate region of the passage 3, a butterfly-type flow control element 6 which can be actuated in order to close or open the passage 3. In the intermediate region of the passage 3, the valve body 2 supports an annular gasket, generally designated by the reference numeral 7, which is made of flexible material and can be engaged by the flow control element 6 when it is moved into the closure position.

According to the invention, the valve body 2 is provided in at least two parts 8a and 8b, which are mutually coupled at a region occupied by the annular gasket 7 and lock said annular gasket 7 between them in the mutual coupling position.

More particularly, the passage 3 has, at least at the intermediate region occupied by the flow control element 6, a substantially cylindrical shape. The flow control element 6 is substantially disk-like and is supported by the valve body 2 so that it can rotate about a diametrical axis 9. The flow control element 6 can rotate on command about the diametrical axis 9, with respect to the valve body 2, in order to pass from an open position, in which it is arranged on a plane which passes through the axis of the intermediate region of the passage 3, to a closed position, in which it is arranged on a plane which is substantially perpendicular to the axis of the intermediate region of the passage 3 and engages, with its perimeter, the annular gasket 7.

The flow control element 6 is crossed by a passage 11 having a splined profile and inside which a pivot 12 is provided having a region 12a with a splined profile that couples to the passage 11. The pivot 12 protrudes, with both of its ends, from the perimeter of the flow control element 6. One end of the pivot 12 engages a rotation seat 13 provided in the valve body 2, while the other end protrudes from the valve body 2 and can be connected to an actuation lever 14 by means of which it is possible to turn the flow control element 6 about the diametrical axis 9.

The valve body 2 comprises a first part 8a and a second part 8b which are mutually coupled by means of a threaded coupling whose axis coincides with the axis of the intermediate region of the passage 3.

The annular gasket 7 is partially accommodated in an annular seat 15 which is formed partly in the first part 8a and partly in the second part 8b of the valve body 2 in the region of mutual coupling. The annular seat 15 is open toward the axis of the intermediate region of the passage 3 in order to expose the inner lateral surface of the annular gasket 7 that can be engaged by the flow control element 6.

The annular seat 15 has regions 15a and 15b which are undercut with respect to a movement toward the axis of the intermediate region of the passage 3 and are engaged by correspondingly shaped regions of the annular gasket 7.

The annular gasket 7 has an outer lateral surface 16 which is substantially cylindrical and an inner lateral surface which is also substantially cylindrical and has, in an intermediate region of its axial extension, a circumferential protrusion 17 which protrudes toward the axis of the annular gasket 7 and is meant to be engaged by the perimeter of the flow control element 6.

The annular gasket 7 has, on its two bases, a circumferential raised coupling portion 18a and 18b which protrudes adjacent to the outer lateral surface 16 and can engage the undercut regions 15a and 15b of the annular seat 15.

The annular gasket 7 has, in the region of its two bases that connect the circumferential coupling protrusions 18a and 18b to the inner lateral surface, circumferential sealing protrusions 19a and 19b which are meant to be compressed at least partially in the coupling of the annular gasket 7 to the annular seat 15.

The first part 8a of the valve body 2 has, at least proximate to the second part 8b of the valve body 2, a substantially hollow cylindrical configuration which is provided, coaxially on its inner surface and starting from the end that is directed toward the second part 8b, with: a female thread 20, which is engaged by the second part 8b; a substantially cylindrical portion of the annular seat 15, which engages the outer lateral surface 16 of the annular gasket 7; and an axial shoulder 21 with an undercut recess 21a, which axially delimits, on one side, the annular seat 15 and is engaged by the circumferential coupling protrusion 18a provided on one of the bases of the annular gasket 7.

The second part 8b of the valve body 2 has, at least proximate to the first part 8a of the valve body 2, a substantially hollow cylindrical shape which has, on its outer surface, a male thread 22 which engages the female thread 20 of the first part 8a. The second part 8b forms, with its end inserted in the first part 8a, an axial shoulder 23 with an undercut recess 23a which axially delimits, on the other side, the annular seat 15 and is engaged by the circumferential coupling protrusion 18b provided on the other base of the annular gasket 7.

The pivot 12 passes through diametrical passages 24a and 24b which are formed in the annular gasket 7, in an intermediate region of its axial extension, and a hole 25 which is formed in the first part 8a of the valve body 2. The rotation seat 13 is formed in the first part 8a of the valve body 2 in a region which lies diametrically opposite the hole 25.

The second part 8b further has, on its outer surface, a flange which forms a retention shoulder 26, which can be engaged by the end of the first part 8a that is directed toward the second part 8b and limits the insertion of the second part 8b inside the first part 8a.

The first part 8a and the second part 8b of the valve body 2 have a substantially cylindrical shape and are coupled coaxially to each other. The passage 3 runs coaxially inside the first part 8a and the second part 8b.

The inlet 4 and the outlet 5 of the passage 3 are threaded internally in order to allow the connection of the two branches of the duct to be controlled by means of the valve, and in the passage 3 there are retention shoulders 27 and 28 for the ends of the branches of the duct that are coupled to the valve body 2.

Advantageously, the inside diameter of the annular gasket 7a is substantially equal to the diameter of the passage 3.

The assembly and the operation of the control valve according to the invention are as follows.

The annular gasket 7 is inserted in the first part 8a in the annular seat 15 before assembling the first part 8a and the second part 8b. The flow control element 6 is arranged at the annular gasket 7, with the passage 11 in alignment with the diametrical passages 24a and 24b of the annular gasket 7, and the pivot 12 is inserted in the passage 11 so that one end of said pivot 12 engages inside of the rotation seat 13 while the other end protrudes from the valve body 2.

The second part 8b of the valve body 2 is then assembled to the first part 8a by screwing the male thread 20 into the female thread 22. The assembly of the second part 8b with the first part 8a locks the annular gasket 7 inside the annular seat 15.

It should be noted that the assembly of the second part 8b with the first part 8a causes an axial compression of the annular gasket 7 which engages hermetically the valve body 2 and the pivot 12. The assembly of the second part 8b with the first part 8a also compresses the circumferential sealing protrusions 19a and 19b, which in this manner exclude with absolute safety the possibility of seepage of fluid between the annular gasket 7 and the annular seat 15 in which it is accommodated.

In the open position, the flow control element 6 is arranged on a plane which passes through the axis of the passage 3. In this position, the annular gasket 7, being substantially completely accommodated inside the annular seat 15, substantially does not hinder the flow of the fluid along the passage 3. When the flow control element 6 is moved into the closure position, it is arranged on a plane which is perpendicular to the axis of the passage 3 and engages, with its perimeter, the circumferential protrusion 17. It should be noted that the flow control element 6 engages the circumferential protrusion 17 only proximate to the end of its closure rotation and therefore applies minimal stress to the annular gasket 7 without causing any separation of the annular gasket 7 from the valve body 2. Also by virtue of this fact, the final closure movement and the initial opening movement of the flow control element 6 are facilitated and can be actuated with less force.

By way of the reduced friction of the flow control element 6 against the annular gasket 7 at the end of the closure movement and at the beginning of the opening movement, seepage of fluid between the annular gasket 7 and the seat 15 is avoided effectively, thus avoiding the separation of the annular gasket 7 from the seat 15 and therefore preventing the annular gasket 7 from being extracted from the annular seat 15.

In practice it has been observed that the control valve according to the invention fully achieves the intended aim and objects, since it has a high safety against the possibility of abnormal deformations of the annular gasket used to form the seal with the flow control element and against the separation of the annular gasket from the valve body.

Another advantage of the flow control element according to the invention is that it does not significantly penalize the fluid passage section.

In practice, the materials used, so long as they are compatible with the specific use, as well as the dimensions, may be any according to requirements and to the state of the art.

The disclosures in Italian Utility Model Application No. MI99U000738 from which this application claims priority are incorporated herein by reference.

What is claimed is:

1. A fluid control valve with a butterfly-type flow control element, comprising a valve body which is crossed by a passage with an inlet and an outlet which can be connected to two branches of a duct for a fluid to be controlled by means of the valve; said valve body accommodating, in an intermediate region of said passage, a butterfly-type flow control element which can be actuated in order to open or close said passage; said valve body supporting, in said intermediate region of the passage, an annular gasket which can be engaged by said flow control element in a closure position, wherein said valve body is provided in at least two parts which are mutually coupled at a region that is occupied by said annular gasket and lock said annular gasket between said parts in a mutual coupling position.

2. The valve according to claim 1, wherein said passage has, at least at said intermediate region, a substantially cylindrical shape; said flow control element having a substantially disk-like configuration and being pivoted to said valve body about a diametrical axis; said flow control element being able to rotate on command about said diametrical axis with respect to said valve body in order to pass from an open position, in which it is arranged on a plane which passes through the axis of said intermediate region of the passage, to the closure position, in which it is arranged on a plane which is substantially perpendicular to the axis of the intermediate region of said passage and engages said annular gasket with its perimeter.

3. The valve according to claim 1, wherein said annular gasket has, on its two bases, a circumferential coupling protrusion which protrudes adjacent to the outer lateral surface and can engage said undercut regions of said annular seat.

4. The valve according to claim 3, wherein said annular gasket has, in the region of its bases that connects said circumferential coupling protrusions to its inner lateral surface, circumferential sealing protrusions which are designed to be compressed at least partially in the coupling of said annular gasket to said annular seat.

5. The valve according to claim 1, wherein said first part of the valve body has, at least proximate to said second part of the valve body, a hollow substantially cylindrical shape which is provided, coaxially on its inner surface and starting from its end that is directed toward said second part, with: a female thread, which is engaged by said second part; a substantially cylindrical portion of the annular seat, which engages the outer lateral surface of said annular gasket and an axial shoulder with an undercut recess which axially delimits, on one side, said annular seat and is engaged by one of the bases of said annular gasket.

6. The valve according to claim 5, wherein said second part of the valve body has, at least proximate to said first part of the valve body, a hollow substantially cylindrical shape which is provided, on its outer surface, with a male thread which engages the female thread of said first part; said second part forming, with its end inserted in said first part, an axial shoulder with an undercut recess which axially delimits, on the other side, said annular seat and is engaged by the other one of the bases of said annular gasket.

7. The valve according to claim 6, wherein said diametrical axis is formed by a pivot which is rigidly connected, in its rotation about said diametrical axis, to said flow control element; said pivot protruding, with one of its ends, from said body and engaging, with its other end, a rotation seat formed inside said valve body.

8. The valve according to claim 7, wherein said pivot passes through diametrical passages formed in said annular gasket, in an intermediate region of its axial extension, and through a hole formed in said first part of the valve body; said rotation seat being formed, in said first part of the valve, in a region which lies diametrically opposite said hole.

9. The valve according to claim 1, wherein said second part is externally provided with a retention shoulder which can engage said first part and limits its insertion in said first part.

10. The valve according to claim 1, wherein said first part and said second part are substantially cylindrical and are coupled coaxially to each other, said passage running coaxially inside said first part and said second part.

11. The valve according to claim 1, wherein the inlet and the outlet of said passage are internally threaded for connection to said branches of the duct to be controlled and wherein in said passage there are retention shoulders for the end of the branches of the duct that are coupled to said valve body.

12. The valve according to claim 1, wherein an inside diameter of said annular gasket is substantially equal to a diameter of said passage.

* * * * *